United States Patent [19]
Martin

[11] 3,908,973
[45] Sept. 30, 1975

[54] APPARATUS FOR SQUARING THE UPPER END OF A GROUND DRIVEN H-BEAM PILE

[76] Inventor: Desaix B. Martin, 2009 Searle St., Des Moines, Iowa 50317

[22] Filed: Jan. 29, 1974

[21] Appl. No.: 437,668

[52] U.S. Cl. .................. 266/23 K; 148/9; 266/23 M
[51] Int. Cl.² ........................................... B23K 7/00
[58] Field of Search .......... 29/482; 266/23 K, 23 M, 266/23 N, 23 NN; 148/9, 9.6

[56] References Cited
UNITED STATES PATENTS

| | | | |
|---|---|---|---|
| 1,004,179 | 9/1911 | Lulle | 148/9 |
| 2,175,615 | 10/1939 | Reed et al. | 29/482 |
| 3,488,229 | 1/1970 | Firestone | 148/9 |
| 3,590,475 | 7/1971 | Geist | 29/482 |
| 3,713,635 | 1/1973 | Strnad | 266/23 MM |
| 3,713,637 | 1/1973 | Cable et al. | 266/23 K |
| 3,785,631 | 1/1974 | Prye | 266/23 M |
| 3,804,391 | 4/1974 | Case | 266/23 L |

Primary Examiner—Al Lawrence Smith
Assistant Examiner—Robert C. Watson
Attorney, Agent, or Firm—Rudolph L. Lowell

[57] ABSTRACT

The apparatus includes an elongated frame structure and a carriage unit movable longitudinally of such structure. A cutting torch assembly is releasably locked on the carriage unit with the cutting member thereof positioned to one side of the frame structure at an angle of about 45° relative to a lateral plane of the frame structure. The frame structure carries clamping means for selective securing the apparatus to the upper end portions of a driven H-beam pile to provide for the successive removal or trimming of the beam side flanges and connecting web such that the resultant terminal top faces of the flanges and web are bevelled and the upper edges of the terminal faces lie in a common horizontal plane normal to the planes of the side flanges and web. A next H-beam, when longitudinally aligned with and supported on the upper edges of the trimmed H-beam, is coupled to the trimmed H-beam by being welded thereto at the bevelled terminal faces.

4 Claims, 12 Drawing Figures

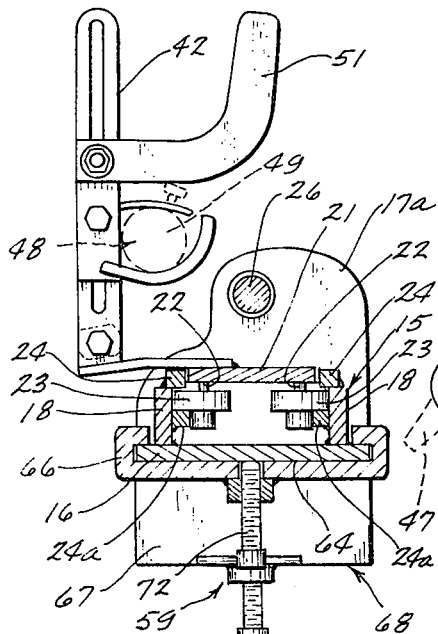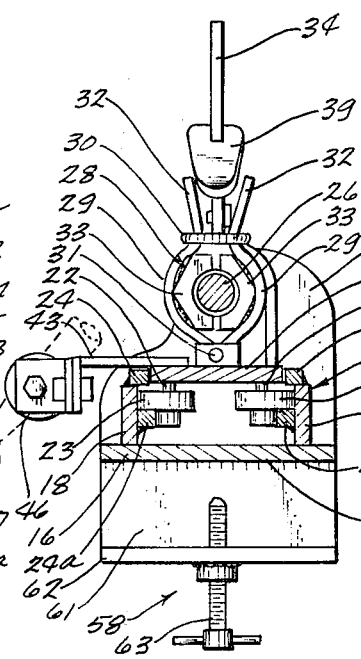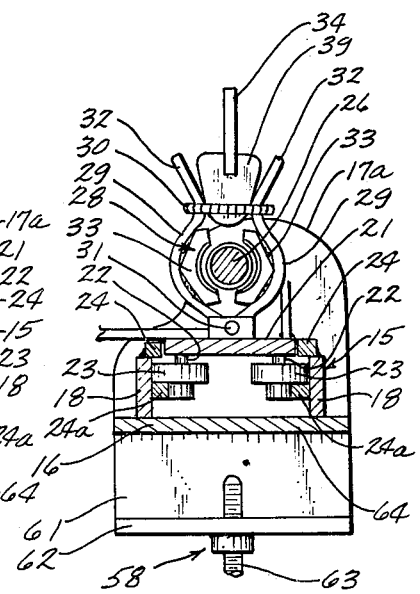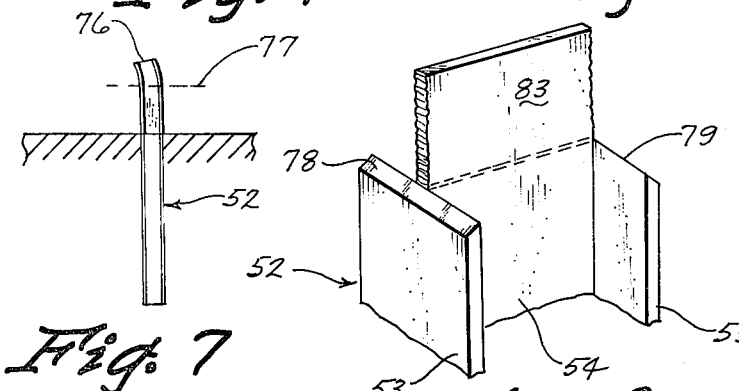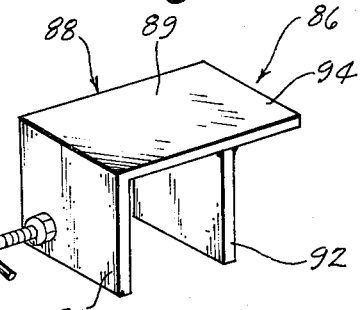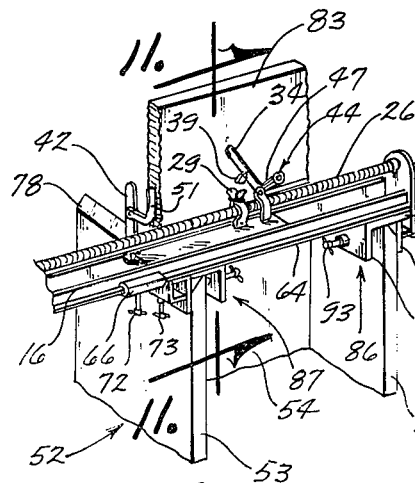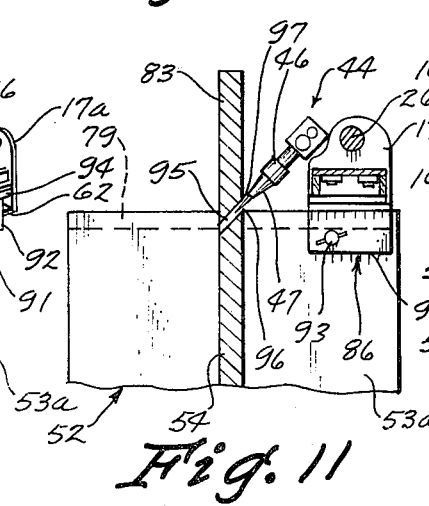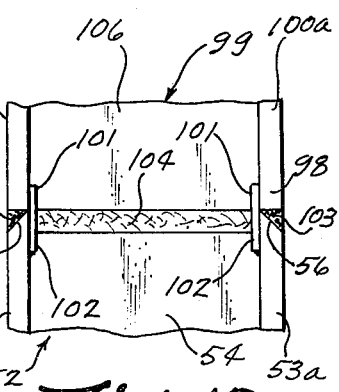

APPARATUS FOR SQUARING THE UPPER END OF A GROUND DRIVEN H-BEAM PILE

SUMMARY OF THE INVENTION

The H-beam trimming apparatus of this invention is of a compact and light weight construction for convenient handling by one man, and is efficient in operation to quickly trim the upper end of a ground driven H-beam pile for longitudinal alignment and welding connection with a next to be driven H-beam pile. Since the upper terminal faces of the driven H-beam pile is bevelled the welding connection is over the full area of the adjacent and opposing terminal faces of the two H-beam piles so that one H-beam constitutes an integral extension of the other H-beam.

BRIEF DESCRIPTION OF THE DRAWING

FIGS. 4 and 5 are enlarged transverse sectional views as seen on lines 4—4 and 5—5, respectively, in FIG. 3;

FIG. 6 is illustrated similarly to FIG. 5 and shows parts thereof in changed positions;

FIG. 7 is a diagrammatic illustration of a ground driven H-beam pile showing the battered and misaligned condition of the upper end thereof;

FIG. 8 is a perspective view of the top section of an H-beam with the upper end portions of the side flanges removed;

FIG. 9 is a perspective view of a clamp attachment that forms part of the trimming apparatus of this invention;

FIG. 10 is a foreshortened perspective view of the trimming apparatus shown in position for cutting the connecting web of an H-beam;

FIG. 11 is a sectional detail view taken on line 11—11 of FIG. 10; and

FIG. 12 is a side elevational view showing the welded connection for joining together the adjacent ends of a pair of aligned H-beams.

DETAILED DESCRIPTION OF THE INVENTION

In the construction of buildings it is often necessary that metal H-beam piles for forming a part of the building base structure be driven into the ground by power hammers to depths that may reach as much as eighty feet. The depth to which a beam pile is driven depends upon the depth at which solid rock or a hard ground layer is reached. As a result of the power hammering at the upper end of the beam pile, such end, when 40 to 50 feet of the beam has been driven into the ground, can become badly battered or bent so as to be out of vertical alignment with the remaining portion of the beam. When this occurs it is necessary to remove the misaligned upper end of the ground driven beam before a second beam can be connected for driving into the ground. The purpose of the H-beam pile trimming or cutting apparatus of this invention is to square or trim the upper end of the first driven beam pile so that the second pile to be driven can be connected therewith in a longitudinally aligned relation.

Figure 2:
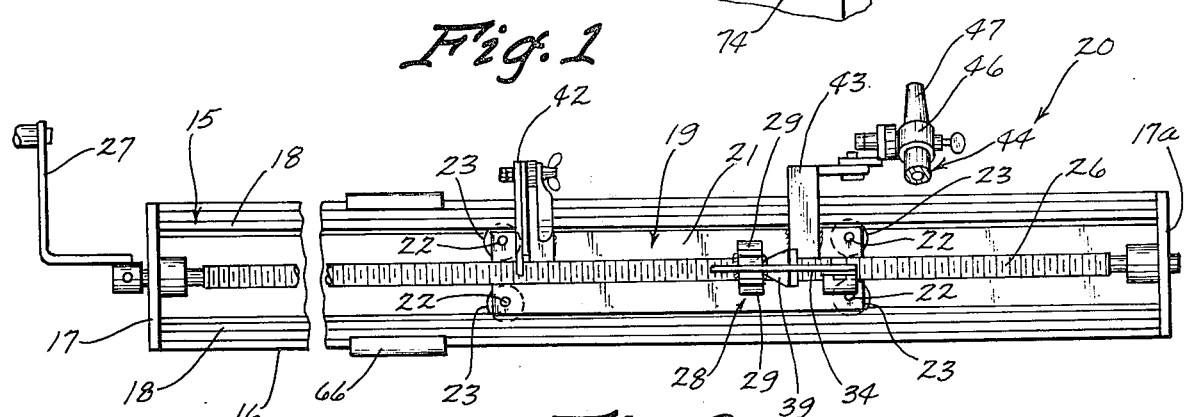
FIG. 2 is a foreshortened top plan view of the trimming apparatus.

The H-beam pile trimming apparatus, indicated generally as 20, (FIGS. 2 and 3) comprises an elongated frame structure 15 that has a flat base member 16 and upright transversely extended end members 17 and 17a. A pair of upright track members 18 for a carriage unit 19 extend longitudinally of the frame structure in a transversely spaced relation on the base member 16. The carriage unit 19 includes a flat, rectangular shaped body member 21 of a transverse dimension to be received between the track members 18.

Each corner of the body member 21 (FIGS. 2 and 4) carries an upright depending shaft 22 for rotatably supporting a corresponding roller 23. The rollers 23 are adapted for rolling engagement with the side surfaces of adjacent track members 18. A pair of upper and lower guide rails 24 and 24a are projected laterally inwardly from each track member 18 and receive therebetween corresponding ones of the rollers 23. The rollers thus have side surfaces supported on the lower guide members 24a for rolling engagement of their peripheral surfaces on adjacent track members. It is also seen that the rollers are retained against upward movement out of track engagement by the upper guide members 24 as best appears in FIG. 4. Movement of the carriage unit 19 longitudinally of the frame structure 15 is limited by the end members 17 and 17a which function as stop members.

To longitudinally move the carriage unit 19 there is provided a screw shaft 26 rotatably supported in the end members 17 and 17a in a position above and parallel to the base member or plate 16 of the frame structure 15. The shaft 26 is rotated by the manipulation of a hand crank 27 located at one end of the shaft at a position outwardly from the end member 17. A nut member 28, operatively associated with the shaft 26, is located upwardly from the body member 21 of the carriage unit 19 (FIGS. 5 and 6). The nut 28 is of a split type and is selectively engageable with the screw shaft 26 by means including a pair of pivoted upright arms 29, the lower ends of which are pivoted on a pin 31 extended longitudinally of and carried on the body member 21. The arms 29 are arranged to opposite sides of the screw shaft 26 and are pivotally movable toward and away from each other transversely of the shaft.

The free or upper end sections 32 of the pivoted arm 29 are arranged in an upwardly diverged relation. A coil spring 30 is interconnected to the arms 29 at a position below the diverged upper end sections 32 thereof so as to continuously bias the arms to the innermost positions therefor. Each arm 29 carries a corresponding half section 33 of the split nut 28, which when the arms are in their innermost positions, is in threadable engagement with the screw shaft to provide for a longitudinal movement of the carriage unit 19 in response to a rotation of the shaft.

Figure 3:
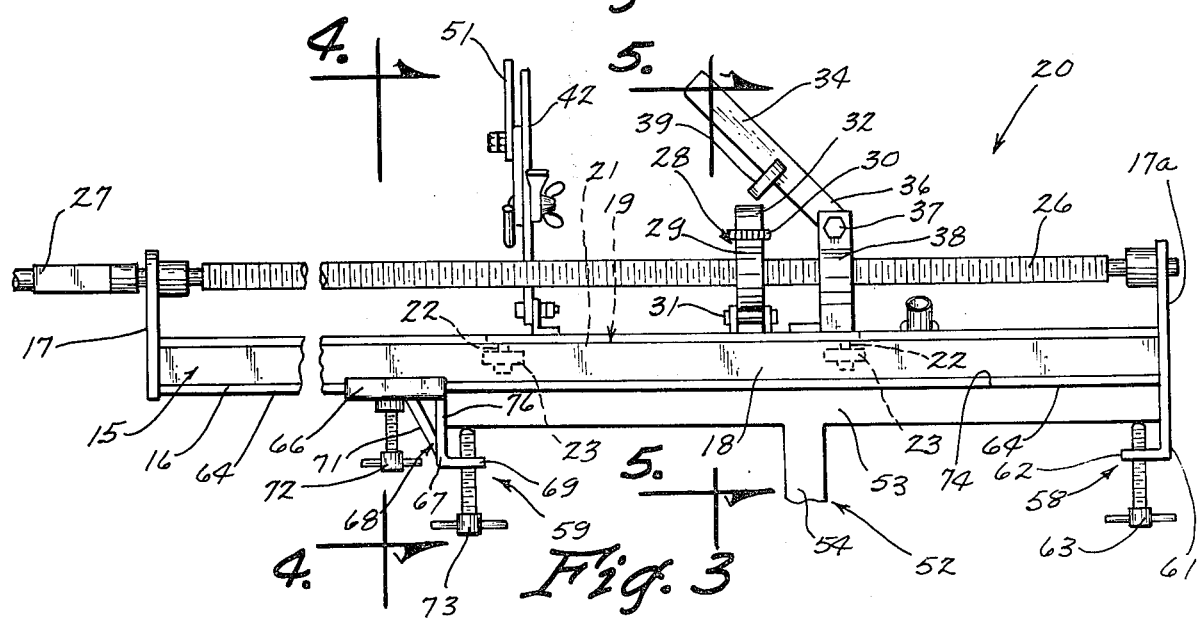
FIG. 3 is a foreshortened side elevational view of the trimming apparatus.

To release the nut 28, so that the carriage unit can be freely moved longitudinally of the frame structure 15 independently of the screw shaft, a pivoted release lever 34 is extended axially of and above the shaft (FIG. 3). The end 36 of the lever 34 is pivoted at 37 to a support 38 projected upwardly from the body member 21 of the carriage unit 19 for up and down pivotal movement of the lever from a first position extended horizontally between the diverged end sections 32 of the pivoted arms 29 to a second position inclined upwardly and spaced from the pivoted arms. The portion of the lever 34 that is movable between the sections 32 of the arms 29 is equipped with a spreader member 39 which functions as a cam member relative to the diverged upper sections 32 of the arms 29.

Thus, on a downward movement of the lever 34 the arms 29 are engaged and spread apart by the cam member 39 from their innermost positions in FIG. 5 to their spread apart positions shown in FIG. 6. The half sections 33 of the nut 28 are thus held by the cam member 39 out of engagement with the screw shaft 26 so that the carriage unit 19 can be manually moved along the track member 18 independently of the screw shaft 26 to a desired adjusted position between the end members 17 and 17a. When the carriage is to be moved by rotation of the screw shaft 26, it is only necessary to move the cam member 39 to its released position, shown in FIG. 5, out of engagement with arms 29. In this released position of the lever 34 the arms 29 are pulled together by the spring 30 to their innermost positions wherein the nut 28 is in threadable engagement with the screw shaft 26.

Mounted in longitudinally spaced relation on the carriage unit 19 are a pair of bracket devices 42 and 43 which constitute a bracket assembly for releasably supporting a usual cutting torch unit 44. The brackets 42 and 43 (FIGS. 2, 4 and 5) project laterally outwardly from one side of the frame structure 15, with the bracket device 43 having at its free or outer end an adjustable ring clamp 46 for receiving the nozzle member or flame end portion 47 of the cutting unit 44. The handle end 48 of the cutting torch 44 is releasably carried in the bracket device 42. It is seen, therefore, that the cutting torch or unit 44 extends longitudinally of and to one side of the frame structure 15, with the nozzle member 47 (FIG. 5) projected downwardly and outwardly away from the frame structure. By adjustment of the ring clamp 46 the downward angle of inclination of the nozzle member 47, relative to the plane of the base member 16, may be varied to accommodate a desired cutting condition. However, for use in the trimming and connecting together of H-beam piles, the angle of inclination is adjusted to about 45° as shown in FIG. 11.

As is well-known, the usual commercially available flame cutting torch unit 44 includes a valve actuator 49 (FIGS. 1 and 4) that is located in the torch handle 48 and controls the supply of the gas mixture to the nozzle member 47. The valve actuator 49 is manually held in a depressed position, when the torch cutting unit is in use, so that when the acutator is released the flame from the nozzle member 47 is automatically extinguished. To depress the actuator 49 the bracket device 42 (FIGS. 1 and 4) is equipped with a pivoted control arm 51 which, when the torch unit 44 is secured within the bracket assembly 42–43, is manually movable into and out of a position for depressing the valve actuator 49. As a result, both hands of the operator, as will appear later, are clear of the torch unit 44 when the trimming apparatus 20 is in use.

Figure 1:
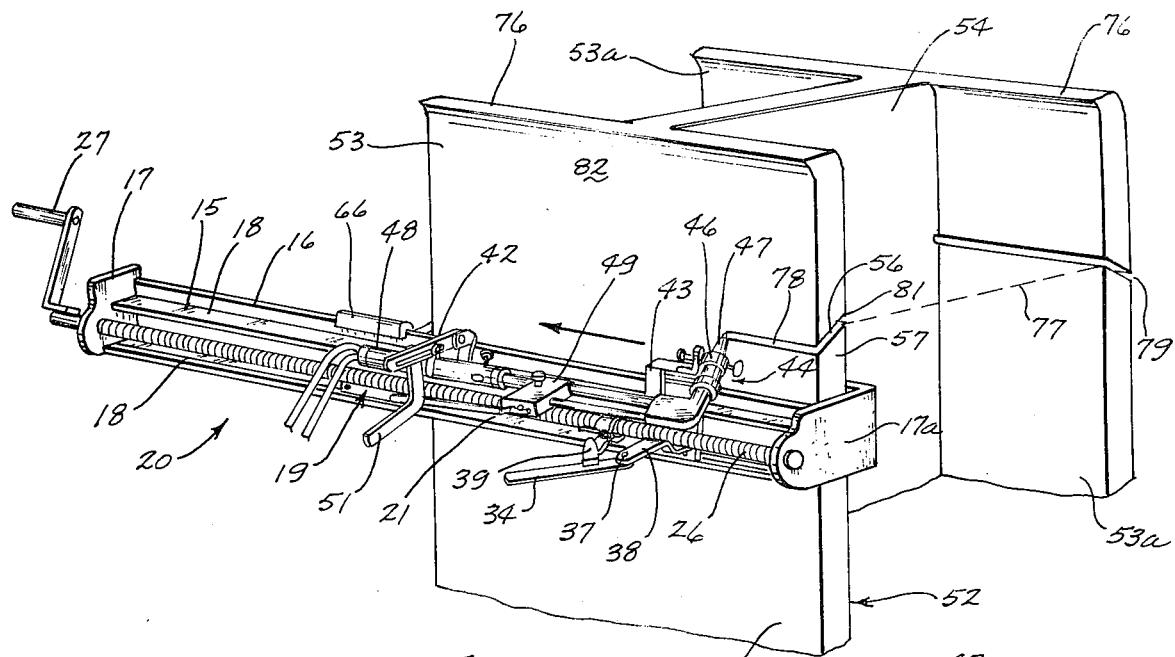
FIG. 1 is a perspective view of the H-beam trimming apparatus shown clamped to an H-beam in a position for bevel cutting or trimming the upper end of a side flange of the beam.

In use, the apparatus 20 is releasably clamped to a ground driven H-beam pile 52 (FIGS. 1 and 7) relative to selected portions of the beam which includes a pair of oppositely arranged parallel side flanges 53 and 53a interconnected by a central web 54. The apparatus 20 is illustrated in FIG. 1 as being clamped to the side flange 53 for movement of the nozzle member 47 transversely thereof to form a bevelled surface 56 at the trimmed end 57 of the side flange 53. In this position the frame structure, including flat base member 16, is in a vertically extended working position. To releasably secure the apparatus to the H-beam 52, the frame structure 15 has a fixed clamping unit 58 (FIG. 3) at one end thereof and an adjustable clamping unit 59 movable longitudinally of the frame structure toward and away from the fixed clamp unit 58. The fixed clamp unit 58 includes an extension 61 of the end member 17a from the flat base member 16. This extension terminates in a flange 62 which is bent inwardly of and in a spaced parallel relation with the base member 16 so that a clamping screw 63 threadable in the flange 62 is axially movable toward and away from the adjacent or facing surface 64 of the base member 16.

The adjustable clamping unit 59 (FIGS. 3 and 4) includes a saddle member 66 extended transversely of and slidably supported on the base member 16 for movement longitudinally thereof. Secured to the saddle member 66 and projected outwardly from the surface 64 of the base member 16 is one leg section 67 of an angle member 68, the other leg 69 of which lies in the plane of and projects in a direction toward the flange 62 of the fixed clamp 58. The leg 69 is interconnected with the saddle member 66 by a brace member 71. A locking screw 72 is threadable in the saddle member 66 for bearing engagement with the base member surface 64 to lock the adjustable clamp unit 59 in an adjustably moved position relative to the fixed clamp unit 58. A clamping screw 73 (FIG. 3) is threadable in the leg 69 for axial movement toward and away from the base member 16.

In order to clamp the apparatus 20 on the flange 53 of the H-beam 14, as shown in FIG. 1, the clamping screws 63 and 73 are moved away from the base member 16 and the adjustable clamp unit 59 is initially moved away from the fixed clamp unit 58 a distance greater than the transverse dimension of the flange 53. With the side 74 of the flange 53 positioned in the fixed clamp unit 58, between the base member 16 and the lip or flange 62, the surface 64 of the base member is layed flat against the flange 53 after which the adjustable clamp unit 59 is moved until the side 76 of the beam flange 53 is again the angle leg 67 as best appears in FIG. 3. The locking screw 72 and clamping screw 73 are then tightened to rigidly secure the apparatus 20 to the beam flange 53.

In this respect it is to be noted that the location of the apparatus 20 on the beam 52 is dependent on the condition of the upper end of the beam and the removal of a sufficient portion of the beam to square all portions thereof at the trimmed end. Thus, as shown for the beam 52 in FIGS. 1 and 7, this portion would include all of the misaligned or battered section 76 so that the trimming would take place in substantially the horizontal plane, indicated at 77.

With the nozzle member 47 set at an angle of about 45° relative to the plane of the base member 16 and extended upwardly toward the beam flange 53, as shown in FIG. 1, the carriage unit 19 is released from the screw shaft 26 by insertion of the lever cam 39 between the pivoted arms 29 which carry the nut half sections 33. The carriage unit is then manually moved to position the nozzle or flame member 47 at the side 74 of the beam flange 53. With the screw shaft 26 reconnected to the carriage unit 19 the torch member 47 is ignited and the holding arm 51 manipulated to lock the valve actuator 49 in a hold down position. On operation of the shaft crank 27 the nozzle member 47 is progressively moved across the full transverse dimension of the beam flange 53 to form the bevelled cut 78.

The above described trimming operation is then repeated for the beam flange 53a so as to form a cut 79 which is transversely opposite from the cut 78 and located in the horizontal plane 77 which lies normal to the beam flanges 53 and 53a and to the web 54 and includes the upper edges 81 of the bevelled surfaces 56. On completion of the second cut 79 it is seen that the portions 82 of the beam flanges 53 and 53a, located above the torch cuts 78 and 79, remain connected to the web 54. On removal of the apparatus 20 from the beam flange 53a, therefore, the torch cutting unit 44 is released from the bracket assembly 42–43 and then operated in a well-known manner to cut the flange portions 82 from the web 54 so as to leave a web portion 83 projected upwardly above the bevelled surfaces 56 of the flanges 53 and 53a, as shown in FIGS. 8 and 10.

To trim the web portion 83 from the H-beam 52, each of the clamp units 58 and 59 is equipped with a like clamp attachment 86 and 87, respectively, (FIGS. 9 and 10). Each of the attachments 86 and 87 (FIG. 9) includes a body member 88 of a generally right angle shape having a base section 89 and a leg section 91. Secured to the base section 89 at a position inwardly of its free end and in a parallel spaced relation with the leg section 91 is a clamping plate 92 of the same size and shape as the leg section 91. A clamping bolt 93 is threadable in the leg section 91 for axial movement toward and away from the clamping plate 92. The portion of the base section 89 that projects outwardly from the clamping plate 92 will be hereinafter referred to as a tongue member 94.

The clamp attachment 86 is assembled with the fixed clamp unit 58 (FIG. 10) by positioning the base section 89 against the surface 64 of the base member 16 with the tongue member 94 located between the base 16 and the lip 62. The clamping screw 63 is then tightened to clamp the tongue 94 against the base member 16. It is to be noted that the tongue member 94 is of the same length as the lip 62 to provide for the squaring of the clamp attachment 86 relative to the base member 16. The apparatus 20 is then positioned along one side of the web extension 83 with the base member 16 supported on the upper edges 81 of the terminal top surfaces 56 of the beam side flanges 53 and 53a. In this position the beam flange 53a is received between the leg 91 and clamping plate 92 of the clamp attachment 86.

The clamp attachment 87 (FIG. 10) is then placed on the beam flange 53 with such flange located between the leg section 91 and clamping plate 92 thereof. In this position the frame structure, including flat base member 16, is in a horizontally extended working position. The adjustable clamp unit 59 is then moved along the base member 16 until the saddle member 66 and leg 69 are in abutting engagement with the tongue member 94 and clamping plate 92 of the clamp attachment 87. This abutting relation is maintained by tightening the locking screw 72 and clamping screw 73. The beam flange 53 is then locked against the clamping plate 92 of the clamp attachment 87 by the clamping screw 93.

With the cutting torch unit 44 positioned in the bracket assembly 42–43, the nozzle member 47 is adjusted to remove the web extension 83 (FIG. 11) at the cut 95 to form a bevelled surface 96 having an upper edge 97 located in the horizontal plane 77.

It is seen, therefore, that the apparatus 20 is easily handled and manipulated for selective positioning relative to the flange and web portions of the H-beam 52 to remove or trim a predetermined length from the upper end thereof so as to leave the upper edges of the bevelled terminal faces of the shortened beam located in a common horizontal plane that is normal to such portions of the beam.

To couple or connect the beam 52 (FIG. 12) to the lower end portion 98 of a next adjacent upper beam 99 the side flanges 100 and 100a of the beam 99 have secured to their inner opposing faces guide plates 101 having extending portions 102 projected longitudinally outwardly from the beam flanges 100 and 100a. The H-beam 99 is then arranged in longitudinal alignment with the H-bema 52 with the guide extensions 102 positioned against the inner facing surfaces of the beam flanges 53 and 53a of the beam 52. As illustrated in FIG. 12, it is seen that the flat terminal faces at the lower ends of the beam flanges 100 and 100a form with the bevelled surfaces 56 of the beam flanges 53 and 53a transversely extended groove 104 is formed between the opposed terminal faces of the webs 54 and 106 of the H-beams 52 and 99, respectively.

By welding the adjoining terminal faces of the H-beams 52 and 99 at the grooves 103 and 104, the beams are rigidly connected together in vertical alignment. In this respect, it is to be noted that the side surfaces of the flanges and webs of the beams 52 and 99 are continuous and smooth at the junction of such beams so as not to impede or interfere with the driving of the beam 99 into the ground. It is to be also noted that the plates 101 function as flash plates to maintain the weld within the grooves 103.

Although the invention has been described with respect to a preferred embodiment thereof it is to be understood that it is not to be so limited since changes and modifications can be made therein which are within the full intended scope of this invention as defined by the appended claims.

I claim:

1. Apparatus for squaring the upper end of a ground driven H-beam pile having spaced side flanges and a connecting web, comprising:
   a. an elongated frame structure,
   b. a cutting torch assembly having a nozzle member with a flame end,
   c. means releasably supporting the torch assembly on and longitudinally of said frame structure with the flame end of said nozzle member spaced laterally outwardly from one side of said frame structure,
   d. means movably mounting said supporting means on said frame structure for movement only longitudinally of said frame structure for either a vertically or horizontally extended working position of the frame structure,
   e. manually operated means for longitudinally moving said mounting means when the frame structure is in a working position therefor,
   f. means for mounting said frame structure in a vertically extended working position arranged transversely of a side flange along the outer surface thereof with the flame end of the nozzle member adjacent said outer surface whereby on said longitudinal movement of the supporting means a predetermined upper portion of a side flange is cut from the beam, and g. means for mounting the frame structure in a horizontally extended working position supported on the top edges of the foreshortened side flanges and arranged transversely of and along one side of the connecting web with the flame end of the nozzle member adjacent the one side of said web and located in the horizontal plane of said upper edges, whereby on said longitudinal movement of the supporting means a predetermined upper portion of the web, corresponding to said upper predetermined portions of the side flanges, is cut from the beam member.

2. The apparatus according to claim 1 wherein:
a. said moving means includes a screw shaft extended longitudinally of said frame structure,
b. means rotatably supporting said screw shaft on the frame structure,
c. a nut member on said supporting means having separable portions movable into and out of threadable engagement with said screw shaft whereby said supporting means is freely movable longitudinally of said frame structure when said separable portions are out of engagement with said screw shaft, and
d. means for manually rotating said shaft.

3. The apparatus according to claim 1 where:
a. said frame structure includes a flat base member, and
b. the means for mounting the frame structure in said vertically extended working position includes a stationary clamp unit at one end of said base member, and a movable clamp unit, and
c. means slidably supporting said movable clamp unit on said base member for adjustable longitudinal movement relative to said stationary clamp unit,
d. each of said clamp units including a clamping member adjustably movable toward and away from said base member, whereby when the base member is positioned against the outer surface of a side flange said clamping members are movable into engagement with the inner surface of a flange.

4. The apparatus according to claim 3, including:
a. a pair of like clamp attachments selectively engageable with said stationary clamp unit and movable clamp unit,
b. each clamp attachment having a tongue member receivable between the base member and the clamping member of a corresponding clamp unit for releasable securement to the base member, and a U-shape body member having a flat base section continuous with and in the plane of said tongue member and a pair of leg members extended transversely of said base section, and
c. a clamping member movably supported on one of said leg members for movement toward and away from the other leg member, each side flange, when the frame structure is in the horizontally extended working position therefor, being receivable between a clamping member and said other leg member of a clamp attachment.

* * * * *